United States Patent
Sugiyama et al.

(10) Patent No.: US 10,250,744 B2
(45) Date of Patent: Apr. 2, 2019

(54) CALL CENTER SYSTEM AND VOICE RECOGNITION CONTROL METHOD OF THE SAME

(71) Applicant: Hitachi Information & Telecommunication Engineering, Ltd., Kanagawa (JP)

(72) Inventors: Takashi Sugiyama, Nakai (JP); Jumpei Yamaguchi, Nakai (JP); Yo Naka, Nakai (JP); Taketoshi Kurihana, Nakai (JP)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 246 days.

(21) Appl. No.: 15/284,783

(22) Filed: Oct. 4, 2016

(65) Prior Publication Data

US 2017/0111499 A1 Apr. 20, 2017

(30) Foreign Application Priority Data

Oct. 19, 2015 (JP) ................. 2015-205805

(51) Int. Cl.
| | |
|---|---|
| *H04M 3/42* | (2006.01) |
| *G10L 15/26* | (2006.01) |
| *G10L 15/30* | (2013.01) |
| *H04M 3/51* | (2006.01) |
| *G10L 15/22* | (2006.01) |

(52) U.S. Cl.
CPC ......... *H04M 3/42221* (2013.01); *G10L 15/22* (2013.01); *G10L 15/26* (2013.01); *G10L 15/30* (2013.01); *H04M 3/5175* (2013.01); *G10L 2015/226* (2013.01); *H04M 2201/40* (2013.01); *H04M 2203/301* (2013.01); *H04M 2203/551* (2013.01); *H04M 2203/558* (2013.01)

(58) Field of Classification Search
CPC ................................. H04M 3/42221
USPC ............... 379/85, 88.01–88.03; 704/270
See application file for complete search history.

(56) References Cited

U.S. PATENT DOCUMENTS 8,898,063 B1 * 11/2014 Sykes .................... G06Q 40/04
704/270

FOREIGN PATENT DOCUMENTS

| JP | 2009-031810 A | 2/2009 |
| JP | 2009-170953 A | 7/2009 |

* cited by examiner

*Primary Examiner* — Md S Elahee
(74) *Attorney, Agent, or Firm* — Mattingly & Malur, PC

(57) ABSTRACT

A call and recorded information management server transmits a requested call identification ID for recognition and an incoming call number corresponding to the ID, to a voice recognition server, which searches for the recognition engine corresponding to the number of the received call, and adds the received ID to a recognition queue. The voice recognition server requests the call and recorded information management server to obtain recorded data by the received ID. The call and recorded information management server transfers the recorded data corresponding to the ID to the voice recognition server to perform voice recognition by the corresponding recognition engine on the recorded data corresponding to the call identification ID stored in the recognition queue, and stores the result as text data. Thus, the most appropriate voice recognition engine can be used and the recognition rate of voice recognition can be increased.

3 Claims, 9 Drawing Sheets

FIG. 4

CALL AND RECORDED INFORMATION MANAGEMENT TABLE 110

| CALL IDENTIFICATION ID | OPERATOR ID | TYPE | EXTENSION NUMBER | INCOMING CALL NUMBER | OUTGOING CALL NUMBER | RECORD FILE PATH |
|---|---|---|---|---|---|---|
| C001 | OP0001 | IN | 1001 | 03XXXYY01 | 080AAABB04 | RECA1.wav |
| C002 | OP0002 | OUT | 1002 | 045CCCDD31 | 03XXXYY01 | RECA2.wav |
| C003 | OP0003 | IN | 1004 | 03XXXYY02 | 080EEEFF22 | RECA3.wav |

BUSINESS INFORMATION-RECOGNITION ENGINE CORRESPONDENCE TABLE 240

| BUSINESS ID 240a | BUSINESS NAME 240b | INCOMING CALL NUMBER 240c | RECOGNITION ENGINE 240d |
|---|---|---|---|
| B001 | HELP DESK (JAPANESE) | 03XXXYY01 | EngineA1 (JAPANESE VERSION) |
| B002 | HELP DESK (ENGLISH) | 03XXXYY02 | EngineA2 (ENGLISH) |
| B010 | COMPLAINTS | 03XXXYY10 | EngineB |
| B020 | PRODUCT INQUIRIES | 03XXXYY15 | EngineC |

CALL CENTER SYSTEM AND VOICE RECOGNITION CONTROL METHOD OF THE SAME

BACKGROUND OF THE INVENTION

The present invention relates to a call center system and its voice recognition control method. More particularly, the present invention relates to a call center system suitable for voice recognition with high accuracy on recorded content of calls between customers and operators in a call center, and relates to a voice recognition control method of the call center system.

Call centers and offices have a system for recording the content of a call between a customer, who is the originator of the call, and an operator to prepare for trouble in the future and to review the content. By performing voice recognition on the recorded data and converting into text data, the recorded data can be searched, displayed, and printed by a computer system, thus allowing the recoded data to be effectively used as business data.

Such a voice recognition technology in call centers is disclosed, for example, in Japanese Unexamined Patent Application Publication No. 2009-170953. The call center device disclosed in Japanese Unexamined Patent Application Publication No. 2009-170953 is designed to allow the administrator to check the content of a call in the event of trouble with a customer and communication failure, by recording the content of the call, analyzing the recorded data (voice recognition), and if a specific word is included in the recorded data, transmitting the recorded data to the administrator terminal.

Further, Japanese Unexamined Patent Application Publication No. 2009-31810 discloses a technology that, in the technology related to the operator business support system, highlights predetermined keywords when converting voice into text data. The operator business support system of Japanese Unexamined Patent Application Publication No. 2009-31810 is designed to input analog call voice from a telephone set into a voice recognition engine, in which keywords are previously registered in a voice recognition dictionary in a word unit, thus converting the analog data into voice text and then converting the voice text into text data with the keyword highlighted, so that the result is displayed on a screen (FIG. 8).

The technologies disclosed in Japanese Unexamined Patent Application Publication Nos. 2009-170953 and 2009-31810 both aim to improve operational efficiency by converting a call into a text and by detecting keywords.

However, the voice recognition in existing call centers has not taken into account in terms of the most appropriate voice recognition performed on the recorded data generated for every different business. In other words, the most appropriate recognition engine should be selected by language and specialized dictionary and there is a problem that the conventional technology does not take into account this point of view.

The present invention has been made to solve the above problems, and an object of the present invention is to provide a call center system in which the most appropriate voice recognition engine can be selected to increase the recognition rate in voice recognition, allowing for performing an effective system operation.

SUMMARY OF THE INVENTION

A call center system according to the present invention is a call center system that records calls from customers and stores the calls as data. The call center system includes: an exchange that performs an exchange of a call from a public telephone network that arrives at an extension; a communication terminal provided for each operator to make calls; an operator information processing terminal that each operator operates; a recorder that records call data transmitted from the exchange and stores as recorded data; a call and recorded information management server that receives call information relating to the call from the exchange, associates the call information with the information relating to the recorded data from the recorder, and stores the call information in a database; and a voice recognition server that performs voice recognition on the recorded data and outputs text data.

Then, the respective devices are connected by a network. The call and recorded information management server includes a call and recorded information management table in which call recognition information, business identification information relating to a call, and management information of recoded data are associated with each other. The voice recognition server includes a business information-recognition engine correspondence table in which the business identification information relating to the call and the voice recognition engine used for voice recognition are associated to each other. Under this configuration, the operator information processing terminal transmits the call identification information to the call and recorded information management server in order to request a voice recognition process. Next, the call and recorded information management server searches the call and recorded information management table for the business identification information relating to the call according to the received call identification information. Then, the call and recorded information management server transmits the call identification information as well as the business identification information relating to the call corresponding to the call identification information, to the voice recognition server. Next, the voice recognition server searches for the corresponding recognition engine according to the received business identification information relating to the call. Then, the voice recognition server adds the received call identification information to a recognition queue to be processed by the corresponding recognition engine. Next, the voice recognition server requests the call and recorded information management sever to obtain the recorded data according to the received call identification information.

Next, the call and recorded information management server searches the call and recorded information management table according to the received call identification information, and transfers the recorded data corresponding to the call identification information to the voice recognition server. Finally, the voice recognition server performs voice recognition on the recorded data corresponding to the call identification information stored in the recognition queue. Then, the voice recognition server stores the recognition result as text data.

Further, in the configuration described above, the business information-recognition engine correspondence table stores information of voice recognition engines that are different for each language, area and type of business.

BRIEF DESCRIPTION OF THE DRAWINGS

FIG. 4 is a diagram of an example of a call information/recorded information management table;

FIG. 5 is a diagram of an example of a business information-recognition engine correspondence table;

DESCRIPTION OF THE PREFERRED EMBODIMENT

Hereinafter, the preferred embodiment according to the present invention will be described with reference to FIGS. 1 to 9.

Figure 1:
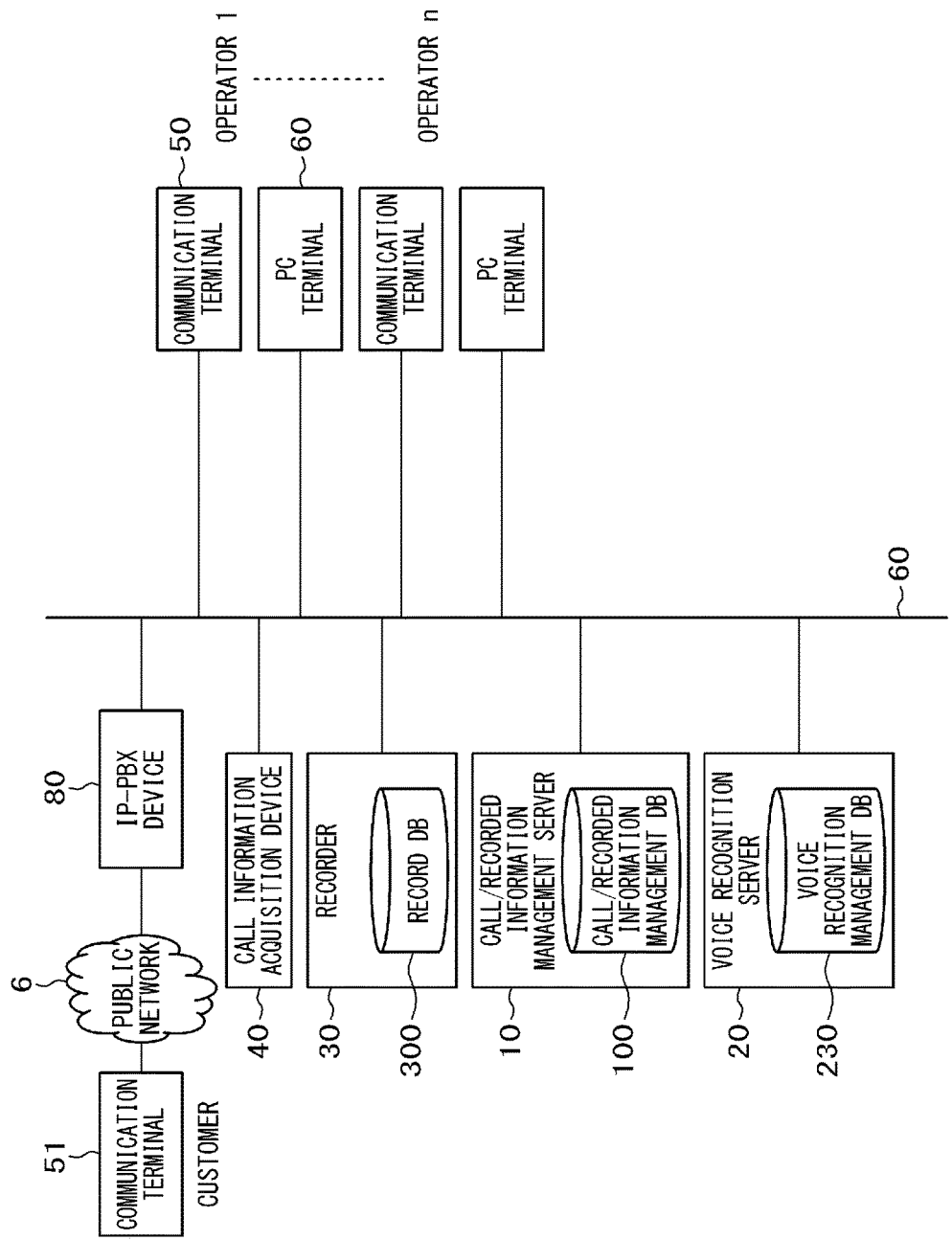
FIG. 1 is a block diagram of an overall call center system.
Figure 2:
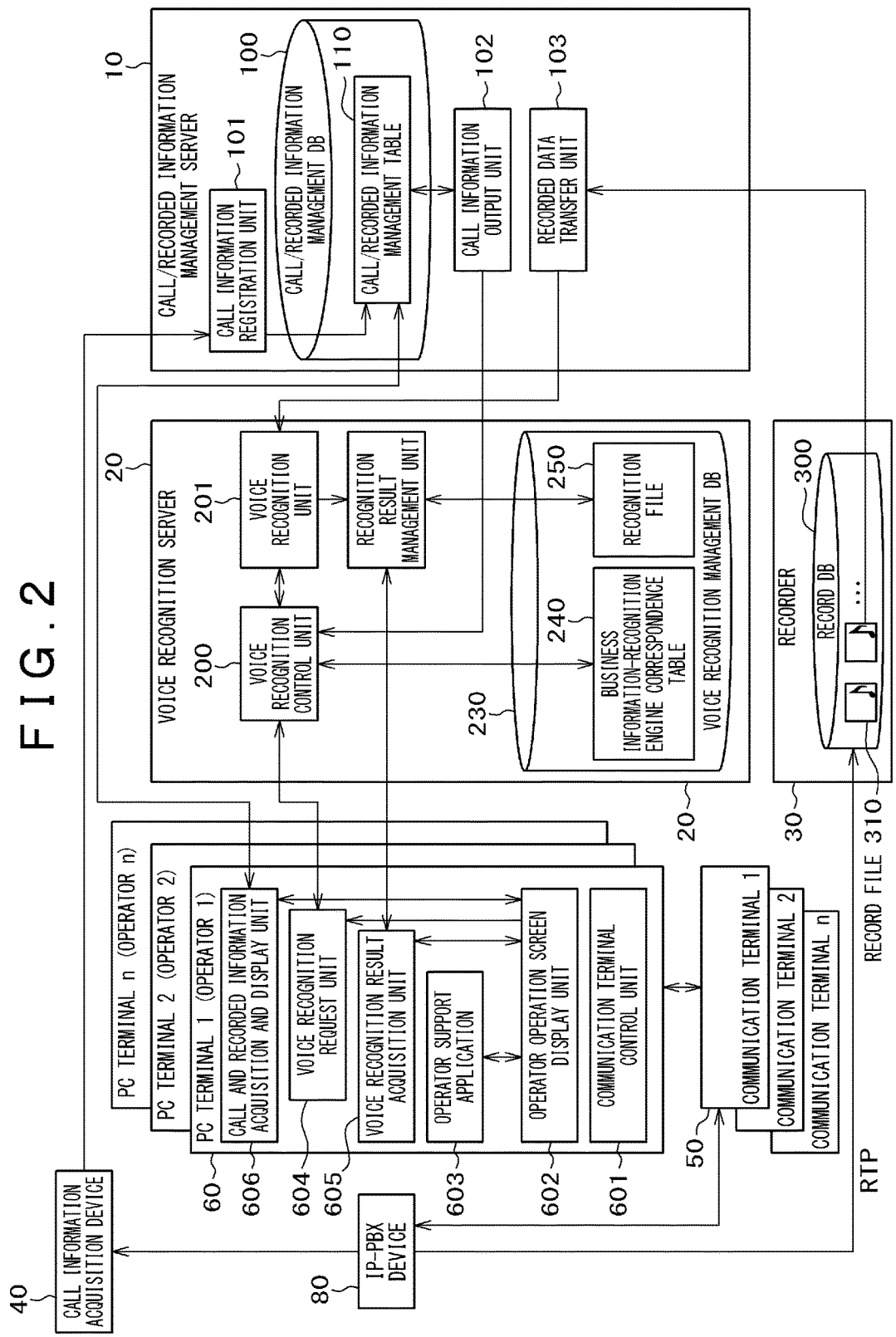
FIG. 2 is a functional relationship diagram of the call center system.
Figure 3:
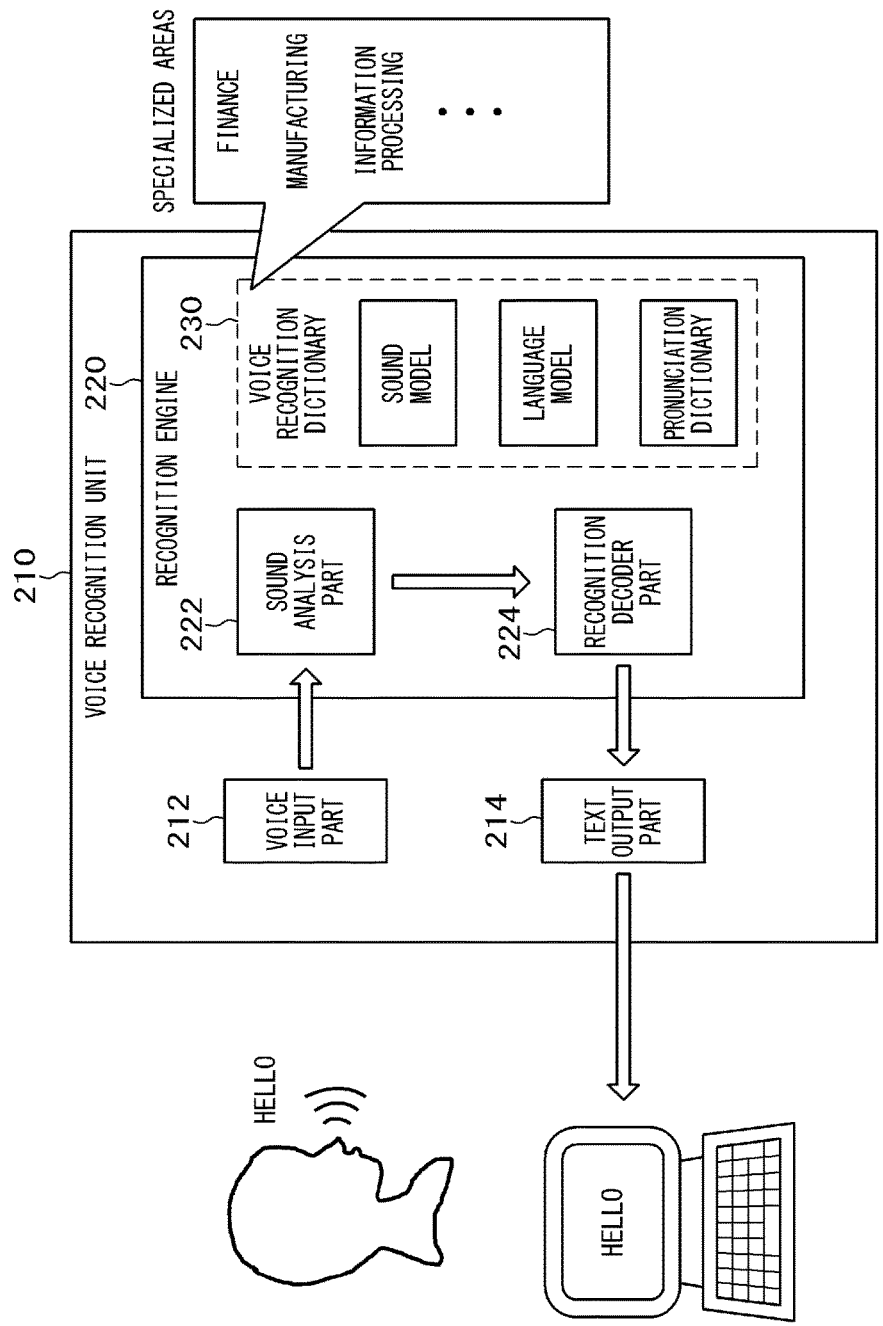
FIG. 3 is a block diagram of a voice recognition unit of a voice recognition server.

First, the outline of the configuration and process of a call center system according to an embodiment of the present invention will be described with reference to FIGS. 1 to 3. FIG. 1 is a block diagram of an overall call center system. FIG. 2 is a functional relationship diagram of the call center system. FIG. 3 is a block diagram of a voice recognition unit of a voice recognition server.

As shown in FIG. 1, the call center system has a configuration to connect an IP-PBX (Internet Protocol-Private Branch eXchange) device 80, which is connected from a communication terminal 51 of a caller (person who makes a call) such as a customer through a public network 6, to a communication terminal 50 of an operator through a network 7 to talk with the caller. The operator can perform telephone operation of the communication terminal 50 from an operator PC terminal 60. When an incoming call from a caller is displayed in the operator PC terminal 60, the operator operates the response from the PC terminal 60. Then, the communication terminal 50 performs a response operation to allow the caller and the operator to talk to each other. Further, the PC terminal 60 performs an operator support application 503 to support the operator business.

The call center system is configured such that the IP-PBX device 80, the recorder 30, the call and recorded information management server 10, a call information acquisition device 40, the voice recognition server 20, a communication terminal 51, communication terminals (for operator 1, operator 2, and so on) 50, and operator PC terminals 60 (for operator 1, operator 2, and so on) are connected through the network 7.

Upon reception of a call from the communication terminal 51 of the customer, the IP-PBX device 80 performs a protocol conversion between the IP network and the public network 6, a control outgoing and incoming calls, and the like.

The call information acquisition device 40 is the device that obtains information relating to a call (call time, extension number, and the like) from the IP-PBX device 80.

The recorder 30 is the device that records the data stream of a call exchanged by the communication terminal 50 as recorded data through the IP-PBX device 80. The recorder 30 accesses a record DB 300 as the database.

The call and recorded information management server 10 is the server that manages the call information in association with the recorded information. The call and recorded information management server 10 accesses a call and recorded information management DB 100 as the database.

The voice recognition server 20 is the server that converts the recorded data, which is the voice data, into text data. The voice recognition server 20 accesses a voice recognition management DB 230 as the database.

The communication terminal 50 and the PC terminal 60 are devices that each of the operators (operator 1, operator 2, and so on) uses for the operator business. More specifically, the communication terminal 50 is the device that communicates with the communication terminal 51 of the customer by an outside line through the public network 6. The PC terminal 60 is the information processing terminal in which the operator controls the communication terminal 50, displays necessary center information, and performs the operator support application.

Next, the relationship between the function of each part of the call center system and the data will be described with reference to FIG. 2.

The PC terminal 60 includes the following functional blocks: a communication terminal control unit 601; an operator business screen display unit 602; an operator support application 603; a voice recognition request unit 604; a voice recognition result acquisition unit 605; and a call and recorded information acquisition and display unit 606.

The communication terminal control unit 601 is the part to control the communication terminal 50 that the operator is using.

The operator business screen display unit 602 is the part to display the operator business screen for the operation support application 603.

The operator support application 603 is the application software to support the operator business. For example, the operator support application 603 may be a response recording system to record and manage the handling of calls with customers, manual display software to display the manual of the operator business, and the like.

The voice recognition request unit 604 is the part to request the voice recognition server 20 to perform voice recognition on the recorded data.

The voice recognition result acquisition unit 605 is the part to receive the result of the voice recognition of the recorded data that the voice recognition request unit 604 has requested the voice recognition server 20.

The call and recorded information acquisition and display unit 606 obtains call and recorded information from the call and recorded information management server 10. Then, the call and recorded information acquisition and display unit 60 displays the call and recorded information on the operation screen.

The call by the communication terminal 50 uses RTP (Real-time Transport Protocol) over the IP network, which is transmitted to the recorder 30, and is stored in the record DB 300 as a record file 310 that is divided at regular intervals.

Further, the call information acquisition device obtains call information from the IP-PBX device 80 and then transmits to the call and recorded information management server 10.

The voice recognition server 20 includes a voice recognition control unit 200, a voice recognition unit 210, and a recognition result management unit 220. The voice recognition server 20 accesses the voice recognition management DB 230.

The voice recognition control unit 200 is the part to provide an instruction to the voice recognition unit 210, in response to a voice recognition request from the PC terminal 60. The voice recognition unit 210 is the part to convert the recorded data into text data by the voice recognition engine (hereinafter, also referred to as the "recognition engine").

The recognition result management unit 220 is the part to store the text data output from the voice recognition unit 210 and to manage the access.

In the voice recognition management DB 230, a business information-recognition engine correspondence table 240 and a recognition file 250 are stored.

The business information-recognition engine correspondence table 240 is the table that associates the recognition engine used for voice recognition of the recorded data relating to the business information in the call center. The recognition file 250 is the text file generated as a result of the voice recognition of the recorded data. Note that the business information-recognition engine correspondence table 240 will be described in detail below.

The call and recorded information management server 10 includes the following functional blocks: a call and recorded information registration unit 101; a call information output unit 102; and a recorded data transfer unit 103. The call and recorded information management server 10 is provided with the call and recorded information management DB 100.

The call and recorded information management DB 100 stores a call and recorded information management table 110. The call and recorded information management table 110 is the table that manages the call information and the recorded information in association with each other. Note that the call and recorded information management table 110 will be described in detail below.

The call and recorded information registration unit 101 obtains the call information from the call information acquisition device 40 as well as the recorded information from the recorder 30. Then, the call and recorded information registration unit 101 registers the obtained information in the call and recorded information management DB 100. The call information output unit 102 outputs the call information to the voice recognition control unit of the voice recognition server 20. The recorded data transfer unit 103 transfers the recorded data, which is stored in the record DB 300 of the recorder 30, to the voice recognition unit 201 of the voice recognition server 20.

Next, the detailed configuration of the voice recognition unit 210 of the voice recognition server 20 will be described with reference to FIG. 3.

As shown in FIG. 3, the voice recognition unit 210 is provided with a voice input unit 212, a recognition engine 220, and a text output unit 214.

The voice input unit 212 is the part to import voice data from the outside. The recognition engine 220 is the body part to perform algorithm processing of voice recognition. The text output unit 214 is the part to output the recognition result as text data.

The recognition engine 220 is provided with a sound analysis unit 222, a recognition decoder 224, and a recognition engine 230.

The sound analysis unit 222 performs a pattern analysis by applying the input voice data to the sound model and pronunciation dictionary of the recognition dictionary 230.

The recognition decoder unit 224 decodes the analysis pattern input from the sound analysis unit 222, and converts the decoded pattern into a text in reference to the language model of the recognition dictionary 230.

The voice recognition dictionary 230 is divided into specialized fields. In FIG. 3, the voice recognition dictionary 230 is shown as being included in the recognition engine 220. However, it is also possible to externally provide the voice recognition dictionary 230 so that it can be referred to as needed.

Next, the data structure used in the call center system of the present embodiment will be described with reference to FIGS. 4 and 5.

FIG. 4 is a diagram showing an example of the call information/recorded information management table. FIG. 5 is a diagram showing an example of the business information-recognition engine correspondence table.

The call and recorded information management table 110 is the table to manage incoming calls arrived in the communication terminal 50, as well as the information relating to the recorded data. The call and recorded information management table 110 is stored in the call and recorded information management DB 100 of the call and recorded information management server 10.

As shown in FIG. 4, the call and recorded information management table 110 includes the following fields: a call identification ID 110a; an operator ID 110b; a type 110c; an extension number 110d; an incoming call number 110f; an outgoing call number 110f; and a record file path 110g.

The call identification ID 110a is the ID to uniquely identify a call on the phone. The operator ID 110b is the identifier of the operator who dealt with the call. The type 110d is recorded to identify whether the call is incoming or outgoing. The extension number 110e is the extension number in which the call is transmitted and received. The incoming call number record file path 110f is the information showing the location of the record file in which the call is recorded. This can be a file path or an identifier that identifies the record file.

The business information-recognition engine correspondence table 240 is the table that shows the correspondence between the business information and the recognition engine used to perform voice recognition on the recorded data of the particular business information. The business information-recognition engine correspondence table 240 is stored in the voice recognition management DB 230 of the voice recognition server 20. The business information-recognition engine correspondence table 240 includes the following fields as shown in FIG. 5: a business ID 240a, a business name 240b, an incoming call number 240c, and a recognition engine 240d.

The business ID 240a is the identifier of the operation into which the business in the call center is categorized. The business name 240b is the name of the business into which the business in the call center is categorized. The incoming call number 240c is the number arrived in the communication terminal 50 of which the operator deals with the business in the call center. In the present embodiment, the incoming call number is used as the key of the business information relating to the call exchanged between the call and recorded information management server and the voice recognition server. For example, it is assumed that the recorded data of a call arrived at the incoming call number "03XXXYY01" is related to the business of the business name "Help Desk (Japanese)", and the recognition engine "Engine A1 (Japanese version)" is scheduled to be used. The business recognition engine 240d is the identification name of the recognition engine used to perform voice recognition on the recorded data of the business.

In general, the voice recognition is preferably performed in such a way that the recognition dictionary is changed according to the applied area of business (finance, manufacturing, or information processing area), the business form (help desk, complaints, or product inquires), and the like. In addition, sometimes the recognition algorithm may need to be changed. In the present embodiment, it is possible to change the recognition engine for each business to which the recoded data applies. As a result, it is possible to increase the recognition rate.

Figure 6:
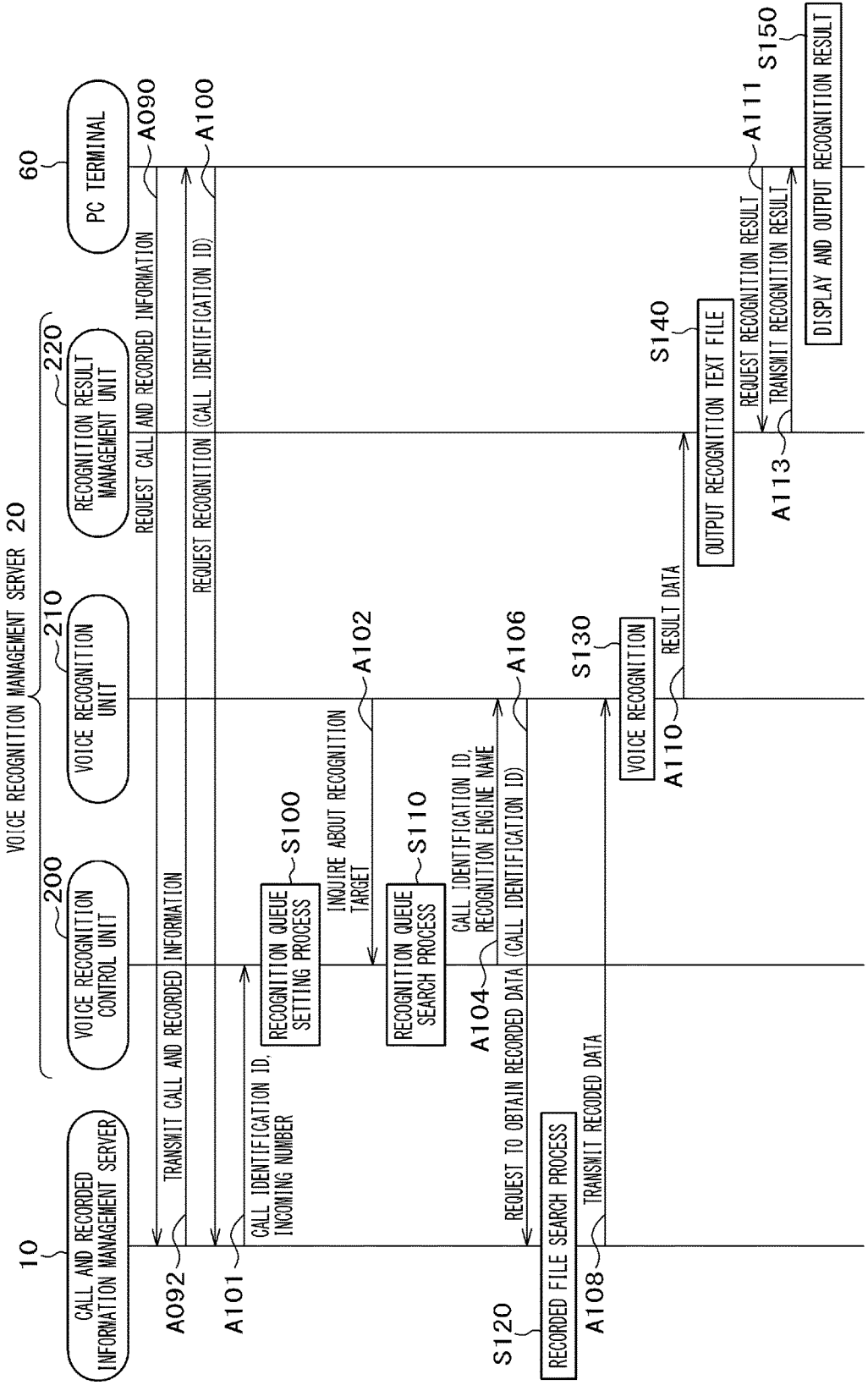
FIG. 6 is a sequence diagram when a voice recognition process is performed on the recorded data in response to a request from a PC terminal.
Figure 7:
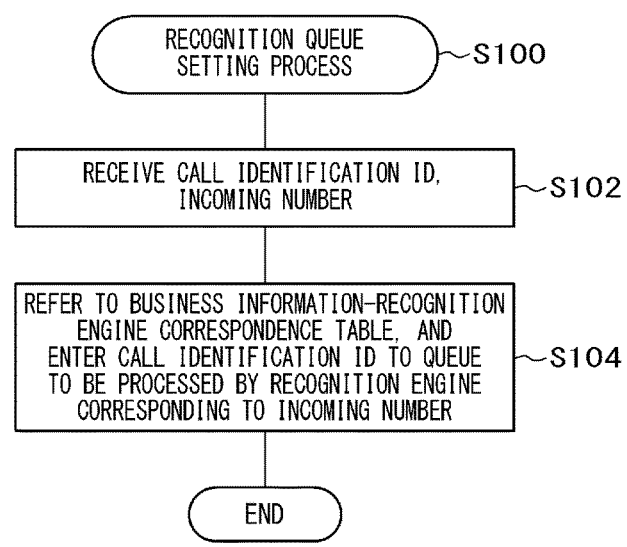
FIG. 7 is a flow chart of a queue setting process in the voice recognition process.
Figure 8:
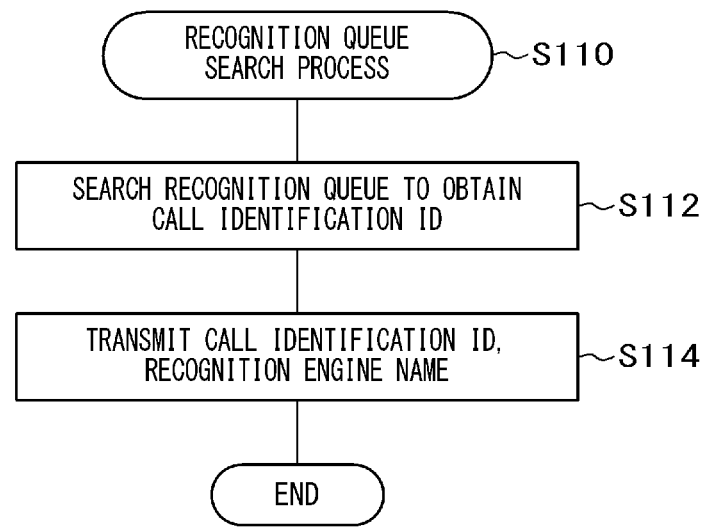
FIG. 8 is a flow chart of a queue search process.
Figure 9:
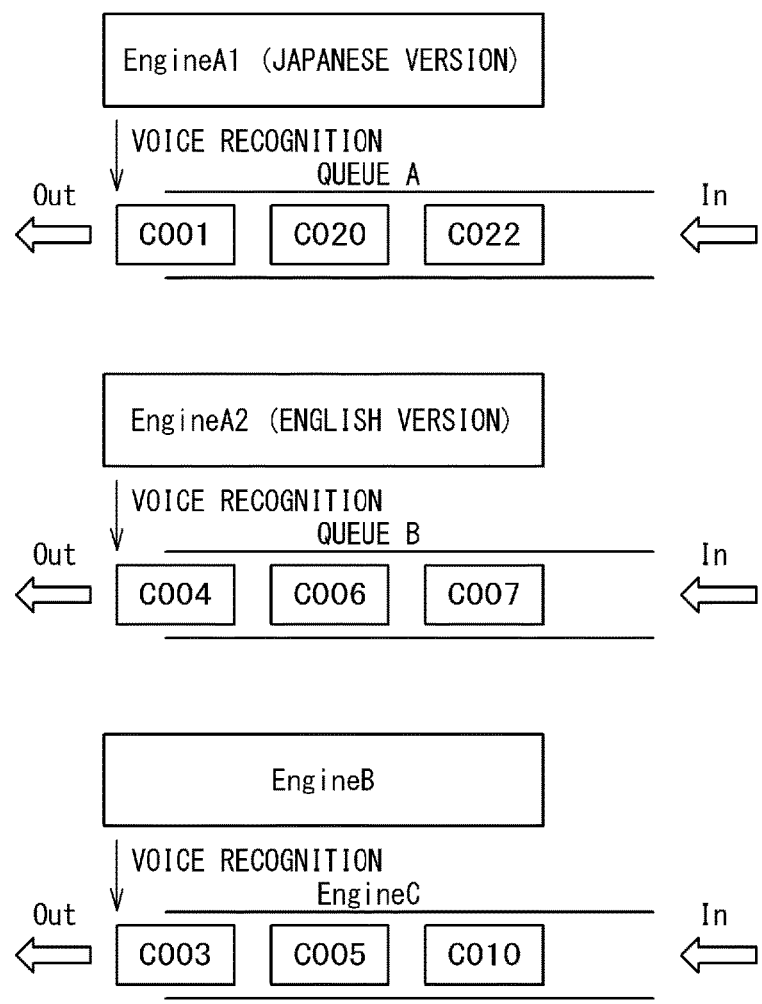
FIG. 9 is a diagram for illustrating the concept of the recognition queue.

Next, the voice recognition process in the call center system according to an embodiment of the present invention will be described with reference to FIGS. 6 to 8. FIG. 6 is a sequence diagram showing when a voice recognition process is performed on the recorded data in response to a request from the PC terminal. FIG. 7 is a flow chart of a queue setting process in the voice recognition process. FIG. 8 is a flow chart of a queue search process. FIG. 9 is a diagram for illustrating the concept of the recognition queue.

Before the process of FIG. 6, as shown in FIG. 2, it is assumed that when a call arrives at the call center from the communication terminal 51 of the customer or when a call is sent to the communication terminal 51 of the customer from the call center, the record file 310 is stored in the record DB 300 of the recorder 30, and the call information at this time is stored in the call and recorded information management table 110 of the call and recorded information management DB 100 of the call and recorded information management server 10 through the IP-PBX and the call information acquisition device. Further, it is also assumed that the appropriate values are stored in advance in the business information-recognition engine management table of the voice recognition server 20 with respect to the business of the call center as well as the recognition engine used in the voice recognition.

First, the operator activates the utility that displays the content of the call and recorded information management table 110 shown in FIG. 4 from the PC terminal 60. Then, the operator requests the call and recorded information to the call and recorded information management server 10 (A090). In response to this request, the call and recorded information management server 10 transmits the call and recorded information (A092). Although not shown, it is assumed that the utility allows the content of the call and recorded information management table 100 to be displayed on the screen of the PC terminal 60 in table format, so that the operator can specify it by a pointed device such as a mouse. By operating such a utility, the operator of the PC terminal 60 specifies the call identification ID to perform a voice recognition request on the call and recorded information management table 110 (A101).

In response to this request, the call and recorded information management server 10 transmits the call identification ID and the corresponding incoming call number to the voice recognition control unit 200 of the voice recognition server 20 (A100).

The voice recognition control unit 200 of the voice recognition server 20 performs a recognition process queue setting process based on the received call identification ID and on the corresponding incoming call number (S100). The recognition queue setting process will be described in detail below with reference to a flow chart.

The voice recognition unit 210 of the voice recognition server 20 makes an inquiry about the recognition target to the voice recognition control unit 200 (A102).

In response to this inquiry, the voice recognition control unit 200 performs a queue search process (S110), and transmits the call identification ID and the recognition engine type to the voice recognition unit 210 (A104). The queue search process will be described in detail below with reference to a flow chart.

Further, the voice recognition unit 210 requests the call and recorded information management server 10 to specify the call identification ID to obtain the recorded data (A106).

In response to this request, the call and recorded information management server 10 searches the call and recorded information management table 110 based on the received call identification ID, and obtains the corresponding record file path (S120). Then, the call and recorded information management server 10 reads the record file 310 of the recorded data 300 of the recorder 30, and transmits the recoded data back to the voice recognition unit 210.

The voice recognition unit 210 performs a voice recognition process on the received recorded data by the recognition engine of the name of the received recognition engine (S130).

Then, the voice recognition unit 210 transmits the result data of the voice recognition to the recognition result management unit 220. The recognition result management unit 220 writes the data as a text file into the recognition file 250 of the voice recognition management DB 200 (S140).

Then, when the recognition result request is made from the PC terminal 60 (A111), the recognition result management unit 220 transmits the recognition result back to the PC terminal 60 (A113). Then, the result is displayed and output by the PC terminal 60 (S150).

Next, the recognition queue setting process of S100 will be described with reference to FIGS. 7 and 9.

The voice recognition control unit 200 of the voice recognition server 20 receives the call identification ID and the incoming call number from the call/record management server 10 (S102).

Then, the voice recognition control unit 200 refers to the business information-recognition engine correspondence table 240 to search for the recognition engine name corresponding to the incoming call number, and enters the call identification ID into the recognition queue corresponding to the recognition engine (S104).

The recognition queue has a data structure, as shown in FIG. 9, in which call identification IDs are arranged in a queue so that the voice recognition is performed by the recognition engine corresponding to the queue on a first-in first-out basis. For example, it is shown that C001, C020, C022 are input to Queue A in this order, so that the voice recognition process is performed on C001, C020, and C022 in this order by Engine A1 (Japanese version) of the recognition engine.

Next, the queue search process of S110 will be described with reference to FIG. 8.

The voice recognition control unit 200 of the voice recognition server 20 searches for the recognition queue, and obtains the call identification ID (S112).

Then, the voice recognition control unit 200 transmits the call identification ID as well as the recognition engine name related to the recognition queue, to the voice recognition unit 210 (S114).

As described above, according to the present embodiment, the voice recognition is performed on the recorded data by the appropriate voice recognition engine for each business of the call center. As a result, it is possible to expect an increase in the recognition rate, thus allowing a more effective operation of the call center.

As described above, according to the present embodiment, it is possible to provide a call center system that allows the most appropriate voice recognition engine to be used to increase the recognition rate of the voice recognition, thus achieving an efficient system operation.

What is claimed is:

1. A call center system that records calls from customers and stores the calls as data, the call center system comprising:

an exchange for performing an exchange of a call from a public telephone network that arrives at an extension;

a communication terminal provided for each operator to make calls;

an operator information processing terminal that each operator operates;

a recorder for recording call data transmitted from the exchange and stores as recorded data;

a call and recorded information management server that receives call information relating to the call from the exchange, associates the call information with the information relating to the recorded data from the recorder, and stores the call information in a database; and a voice recognition server that performs voice recognition on the recorded data and outputs text data, wherein the exchange, the communication terminal, the operator information processing terminal, the recorder, the call and recorded information management server, and the voice recognition server are connected by a network, wherein the call and recorded information management server includes a call and recorded information management table in which call identification information, business identification information relating to a call, and management information of recorded data are associated with each other, wherein the voice recognition server includes a business information-recognition engine correspondence table in which the business identification information relating to the call and a voice recognition engine used for voice recognition are associated to each other, wherein the operator information processing terminal transmits the call identification information to the call and recorded information management server in order to request a voice recognition process, wherein the call and recorded information management server searches the call and recorded information management table for the business identification information relating to the call according to the received call identification information, and transmits the call identification information as well as the business identification information relating to the call corresponding to the call identification information, to the voice recognition server, wherein the voice recognition server searches for the corresponding voice recognition engine according to the received business identification information relating to the call, and adds the received identification information to a recognition queue to be processed by the corresponding voice recognition engine, wherein the voice recognition server requests the call and recorded information management server to obtain the recoded data according to the received call identification information, wherein the call and recorded information management server searches the call and recorded information management table according to the received call identification information, and transfers the recoded data corresponding to the call identification information to the voice recognition server, and wherein the voice recognition server performs voice recognition on the recorded data corresponding to the call identification information stored in the recognition queue by using the corresponding voice recognition engine, and stores the recognition result as text data.

2. The call center system according to claim 1, wherein the business information-recognition engine correspondence table stores information of voice recognition engines that are different for each language, area and type of business.

3. A voice recognition control method in a call center system that records calls from customers and stores as data, wherein the call center system includes:

an exchange for performing an exchange of a call from a public telephone network that arrives at an extension;

a communication terminal provided for each operator to make calls;

an operator information processing terminal that each operator operates;

a recorder for recording call data transmitted from the exchange and stores as recorded data;

a call and recorded information management server that receives call information relating to the call from the exchange, associates the call information with the information relating to the recorded data from the recorder, and stores the call information in a database; and a voice recognition server that performs voice recognition on the recorded data and outputs text data, wherein the exchange, the communication terminal, the operator information processing terminal, the recorder, the call and recorded information management server, and the voice recognition server are connected by a network, wherein the call and recorded information management server includes a call and recorded information management table in which call identification information, business identification information relating to a call, and management information of recorded data are associated with each other, wherein the voice recognition server includes a business information-recognition engine correspondence table in which the business identification information relating to the call and a voice recognition engine used for voice recognition are associated to each other, the voice recognition control method comprising:

a step in which the operator information processing terminal transmits the call identification information to the call and recorded information management server in order to request a voice recognition process;

a step in which the call and recorded information management server searches the call and recorded information management table for the business identification information relating to the call according to the received call identification information, and transmits the call identification information as well as the business identification relating to the call that corresponds to the call identification information, to the voice recognition server;

a step in which the voice recognition server searches for the corresponding voice recognition engine according to the received business identification information relating to the received call, and adds the received call identification information to a recognition queue to be processed by the corresponding voice recognition engine;

a step in which the voice recognition server requests the call and recorded information management server to obtain the recorded data according to the received call identification information;

a step in which the call and recorded information management server searches the call and recorded information management table according to the received call identification information, and transfers the recorded data corresponding to the call identification information to the voice recognition server; and a step in which the voice recognition server performs voice recognition on the recorded data corresponding to the call identification information stored in the recognition queue by using the corresponding recognition engine, and stores the recognition result as text data.

\* \* \* \* \*